US006247717B1

(12) United States Patent

Lovins et al.

(10) Patent No.: US 6,247,717 B1
(45) Date of Patent: Jun. 19, 2001

(54) WHEEL MOUNTING ASSEMBLY

(75) Inventors: Terrence F. Lovins, Platville; Jerry L. Wilson; Cynthia A. Schenk, both of Longmont; Jim Black, Berthoud, all of CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/430,504

(22) Filed: Oct. 29, 1999

(51) Int. Cl.[7] .......... B62K 1/00

(52) U.S. Cl. .......... 280/250.1

(58) Field of Search .......... 280/250.1, 304.1, 280/86.75, 86.751; 301/124.1

(56) References Cited

U.S. PATENT DOCUMENTS 4,650,201 3/1987 Hartwell .
4,652,005 3/1987 Hartwell .
5,131,672 7/1992 Robertson et al. .
5,267,745 12/1993 Robertson et al. .
5,294,142 * 3/1994 Weege .......... 280/250.1
5,320,373 6/1994 Robertson et al. .
5,361,494 11/1994 Robertson et al. .
5,409,247 4/1995 Robertson et al. .
5,851,018 12/1998 Curran et al. .
6,168,177 * 1/2000 Schillo et al. .......... 280/250.1

* cited by examiner

*Primary Examiner*—Brian L. Johnson
*Assistant Examiner*—Matthew Luby
(74) *Attorney, Agent, or Firm*—MacMillian, Sobanski & Todd, LLC

(57) ABSTRACT

A wheel mounting assembly comprises an insert that is adapted to be inserted into a camber tube of a wheelchair. The insert includes a first axle sleeve that is disposed at a first angle relative to horizontal and a second axle sleeve that is disposed at an angle relative to the first angle. Each of the axle sleeves is adapted to receive a wheelchair wheel axle.

18 Claims, 5 Drawing Sheets

WHEEL MOUNTING ASSEMBLY

BACKGROUND

The present invention is related in general to an assembly for mounting a wheel to a wheelchair frame. More particularly, the invention relates to a wheelchair drive wheel mounting assembly that permits adjustment of the camber angle of the drive wheel.

It is known to enhance the stability and control of a wheelchair by adjusting the camber of the wheelchair drive wheels. The camber of the drive wheels may be adjusted so that the drive wheels rotate in a plane that is angled relative to a vertical plane. Consequently, the axis of rotation is angled relative to a horizontal axis. The camber is typically adjusted so the top of the drive wheels are spaced closer together than the bottom of the drive wheels. The angle of the axis of rotation relative to the horizontal axis is commonly referred to as the "camber angle." Camber angles often range from about zero to about sixteen degrees. The amount of camber angle is often dependent upon the space and activity in which the wheelchair is being operated. For example, narrow paths of operation, such as hallways or corridors, may dictate that the camber angle be sufficiently small enough to fit within the path of operation. Conversely, activities that require a great amount stability and control may necessitate a relatively large camber angle.

Devices for permitting the adjustment of the camber angle of drive wheels are known. For example, it is known to provide an axle tube that is adapted to receive a camber tube which, in turn, is adapted to receive camber plugs. Counterbores extend through opposing ends of each plug. Each counterbore is disposed at a predetermined angle and position. Each counterbore defines a recess for receiving a drive wheel axis. The camber angle of each drive wheel may be changed by removing the camber plug from the camber tube, turning the camber tube 180 degrees, and reinserting the camber to tube into the axle tube. An example of this arrangement is shown in U.S. Pat. No. 5,851,018, issued to Curran et al. Other camber plugs are shown in U.S. Pat. Nos. 5,131,672 and 5,320,373, both issued to Robertson et al. Robertson et al. disclose various camber plugs each having a different camber angle. The camber plugs are releasably attachable within a recess in the sides of the wheelchair chassis.

Conventional camber angle adjustment devices have a disadvantage in that they require the timely and often cumbersome task of removing a camber plug from a tube, turning the plug in some way, and then reinserting the plug into the tube. A wheel mounting assembly is needed that permits adjustment of the camber angle of the drive wheels without having to remove or rotate a camber plug.

SUMMARY

The present invention is directed towards a wheel mounting assembly that permits adjustment of the camber angle of the drive wheels without having to remove or rotate a camber plug. The assembly comprises an insert that is adapted to be inserted into a camber tube of a wheelchair. The insert includes a first axle sleeve that is disposed at a first angle relative to horizontal and a second axle sleeve that is disposed at an angle relative to the first angle. Each of the axle sleeves is adapted to receive a wheelchair wheel axle.

Various objects and advantages of this invention will become apparent to those skilled in the art from the following detailed description of the preferred embodiment, when read in light of the accompanying drawings.

DETAILED DESCRIPTION

Figure 1:
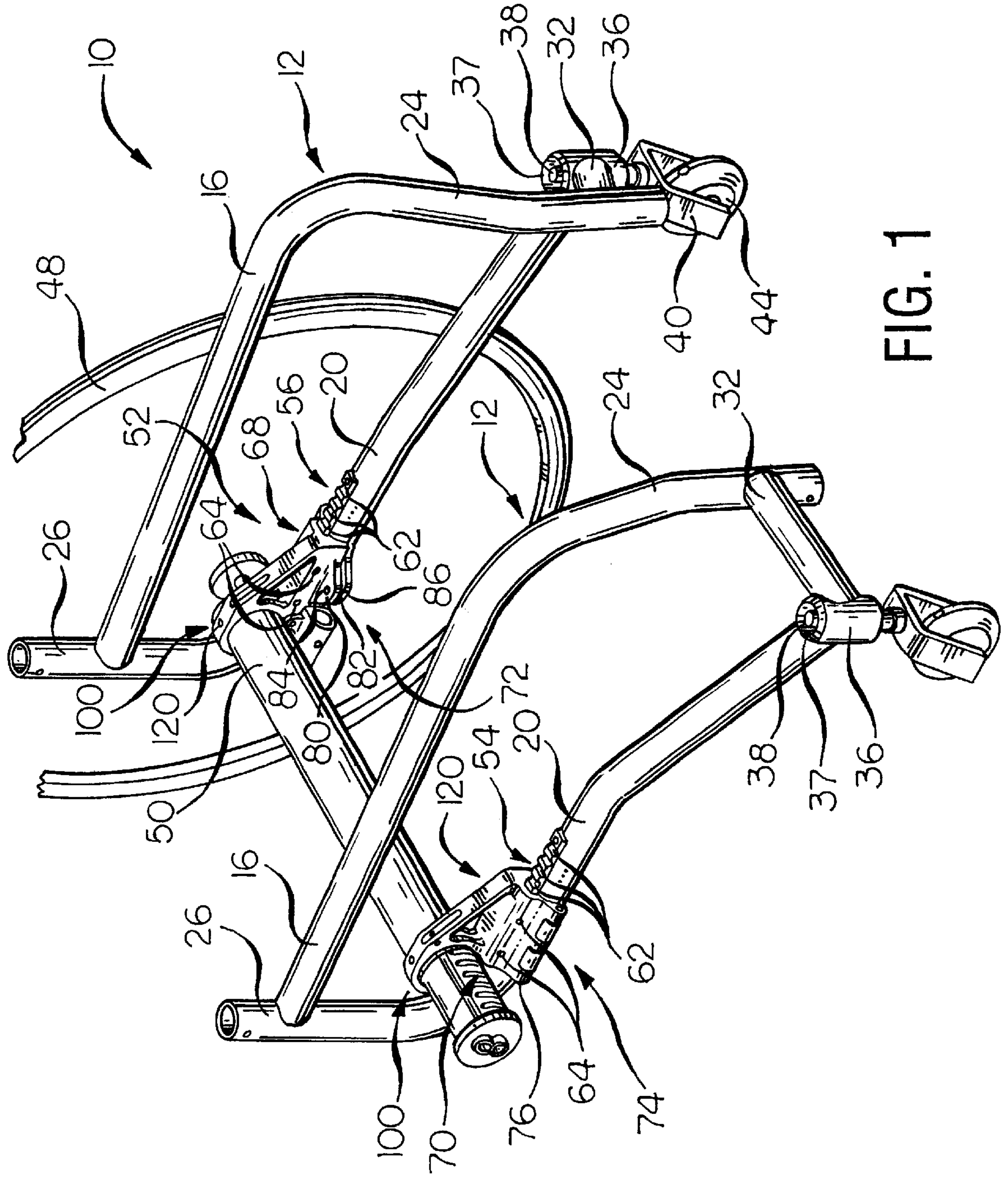
FIG. 1 is a front perspective view of a wheelchair base frame having a rear drive wheel attached thereto with a mounting assembly according to the invention.

Referring now to the drawings, there is illustrated in FIG. 1 a wheelchair base frame 10. The base frame 10 comprises a pair of opposing side rails 12. The side rails 12 each has an upper tube 16 and a lower tube 20 joined by a front tube 24 and a rear tube 26. A leg 32 extends laterally from each of the front tubes 24 for supporting a caster housing 36. Each caster housing 36 defines a bore 37 for receiving a caster fork stem 38. The stem 38 is fixed axially within the bore 37 but permitted to pivot so that the caster forks 40 may pivot relative to the caster housings 36. Each caster fork 40 has a caster or wheel 44 rotatably or movably attached thereto. The wheels 44 engage a supporting surface, such as the floor or ground, to support the front of the base frame 10 relative to the supporting surface.

The rear end of the base frame 10 is supported relative to the supporting surface by a pair of drive wheels 48 (only one shown). The drive wheels 48 are differentially driven to navigate the wheelchair. The drive wheels 48 are rotatably or movably supported with respect to the side rails 12 by a laterally extending camber tube 50. The camber tube 50 is a substantially cylindrical tubular material which is dimensioned to span the side rails 12. The camber tube 50 is coupled or clamped to the side rails 12 by a pair of opposing lower clamps 52, 54. The clamps 52, 54 are identical with the exception that one is a mirror image of the other.

An elongate rail 56 may be attached to each of the lower tubes 20. The elongate rails 56 may be attached to the lower tubes 20 in any suitable manner, including welding, riveting, or the like. The elongate rails 56 each includes a plurality of longitudinally spaced teeth (shown but not referenced) forming recesses 62 between the teeth. The recesses 62 are adapted to receive longitudinally spaced, transverse pins 64 that extend laterally through the clamps 52, 54. The clamps 52, 54 are longitudinally adjustable relative to the lower tubes 20 by selectively engaging the transverse pins 64 in desired recesses 62.

The clamps 52, 54 each comprises two parts, namely: an upper part 68, 70 and a lower part 72, 74. The upper and lower parts 68, 70 and 72, 74 are movably attached to one another by a hinge (only one hinge 76 shown). The hinges 76 each comprises hinge elements joined together by a hinge pin (shown but not referenced). The upper parts 68, 70 each includes an upper tab (only one upper tab 80 shown) and the lower parts 72, 74 each includes a lower tab (only one tab 82 shown). The upper tab 80 has a hole 84 therein that aligns with a slot 86 in the lower tab 82 to receive a fastener, such as a lock pin (not shown), for fastening the upper parts 68, 70 and lower parts 72, 74 together in a clamped position.

The upper and lower parts 68, 70 and 72, 74 each defines a semi-cylindrical bore (not clearly shown). Corresponding upper and lower parts 68, 70 and 72, 74 are joined together to form elongate bores for receiving the lower tubes 20 of the side rails 12. A recess (shown but not referenced) is provided in an underside of each clamp upper part 68, 70. The recesses are provided for receiving the elongate rails 56. The transverse pins 64 extend laterally through the recesses and are adapted to engage the recesses 62 in the elongate rails 56 to fix the clamps 52, 54 in a desired longitudinal position along the elongate rails 56. The recesses 62 in the elongate rails 56 may be spaced discretely apart (e.g., in ½ or ¾ inch increments) to allow for incremental adjustments of the clamps 52, 54 relative to the lower tubes 20 of the side rails 12. This permits the center of gravity of the wheelchair occupant to be incrementally adjusted.

Figure 2:
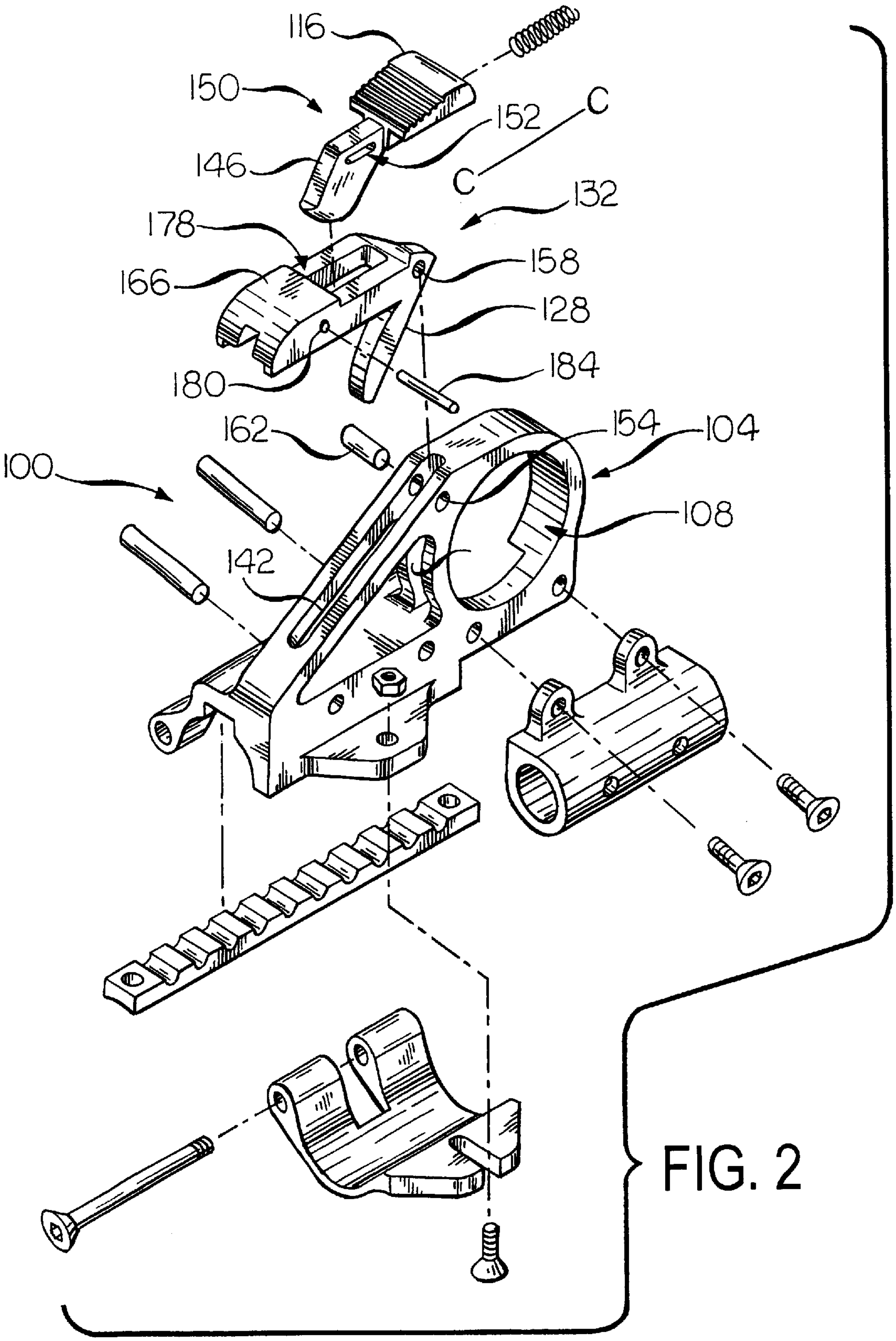
FIG. 2 is an enlarged exploded perspective view of a mounting assembly shown in FIG. 1.

A top or upper bracket 100 extends upwardly from an upper surface of each upper part 68, 70 of the clamps 52, 54. As shown in FIG. 2, each bracket 100 has a cylindrical ring 104 that defines an opening 108 for receiving a corresponding one of the opposing ends of the camber tube 50. A forward portion of each ring 104 is provided with a slot 112 which is adapted to align with a corresponding slot 114 (FIG. 3) in opposing ends of the camber tube 50. The rearward portion of each ring 104 is provided with a hole 120 that is adapted to align with a hole 118 (FIG. 3) in the camber tube 50. The aligned slots 112 are adapted to receive a forward, downwardly extending slot-engaging portion 128 of a latch lever 132. The aligned holes 120 and 118 are adapted to receive a setscrew 134. The slot-engaging portion 128 of the latch lever 132 and the setscrew 134 (FIG. 3) are adapted to engage portions of a camber plug 136 (FIG. 4) to secure the camber plug 136 with respect to the camber tube 50. The setscrew 134 is further adapted to align the camber plug 136 in a proper orientation (e.g., a vertical orientation) with respect to the camber tube 50.

The brackets 100 each has a forwardly extending brace 138. Each of the braces 138 has a slot 142 that aligns with the slot 112 in the ring 104. The slot 142 in the bracket 100 is provided for receiving a forward, downwardly extending lock portion 146 of a locking release lever 150. A transverse hole 154 extends laterally through the bracket 100 proximate an intersection of the ring 104 and the brace 138. The transverse hole 154 is adapted to align with a hole 158 in the latch lever 132. The aligned holes 154 and 158 are adapted to receive a pivot pin 162 for pivotally coupling the latch levers 132 to the brackets 100.

Each latch lever 132 is substantially L-shaped in construction, including the aforementioned slot-engaging portion 128 and a depressible forwardly extending lever portion 166. Upon depressing the lever portion 166 of the latch lever 132 in the direction of arrow A (FIG. 3), the slot-engaging portion 128 is displaced downwardly and rearward in the direction of arrow B (FIG. 3) through the aligned slots 112 and 114 in the ring 104 and the camber tube 50.

As shown in the drawings, the latch lever 132 may include an upper body having a longitudinally disposed opening or slot 178 for receiving a lock portion 146 of the locking release lever 150. An intermediate portion of the locking release lever 150 or an upper rear portion of the lock portion 146 may be provided with a transverse slot 152 which is adapted to align with a transverse hole 180 in a forward portion of the locking release lever 150. A pivot pin 184 may be inserted through the aligned transverse hole 180 and slot 152 to pivotally couple the locking release lever 150 to the latch lever 132. The pivot pin 184 is permitted to slide longitudinally along the line C—C in the slot 182 to provide a sliding or movable pivot. A rear portion of the latch lever 132 is depressed to receive a lever portion 166 of the locking release lever 150 upon engaging the slot-engaging portions 128 of the latch lever 132 with the slots 112 and 114 to latch the latch lever 132.

Figure 3:
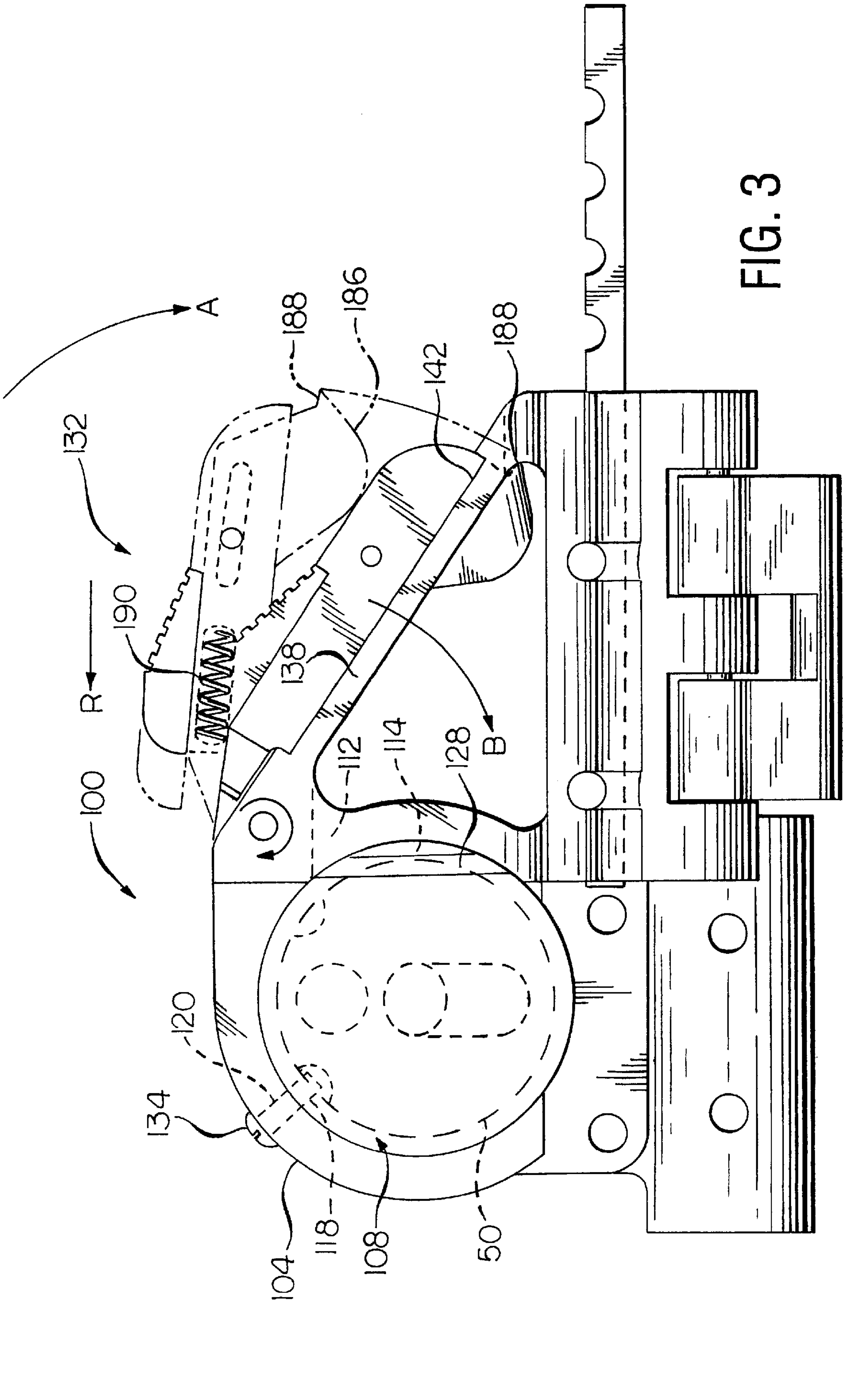
FIG. 3 is an enlarged side elevational view of the wheel lock assembly shown in FIG. 2 further showing a camber tube, camber plug, and a locking release lever released and a latch lever unlatched in hidden line.
Figure 4:
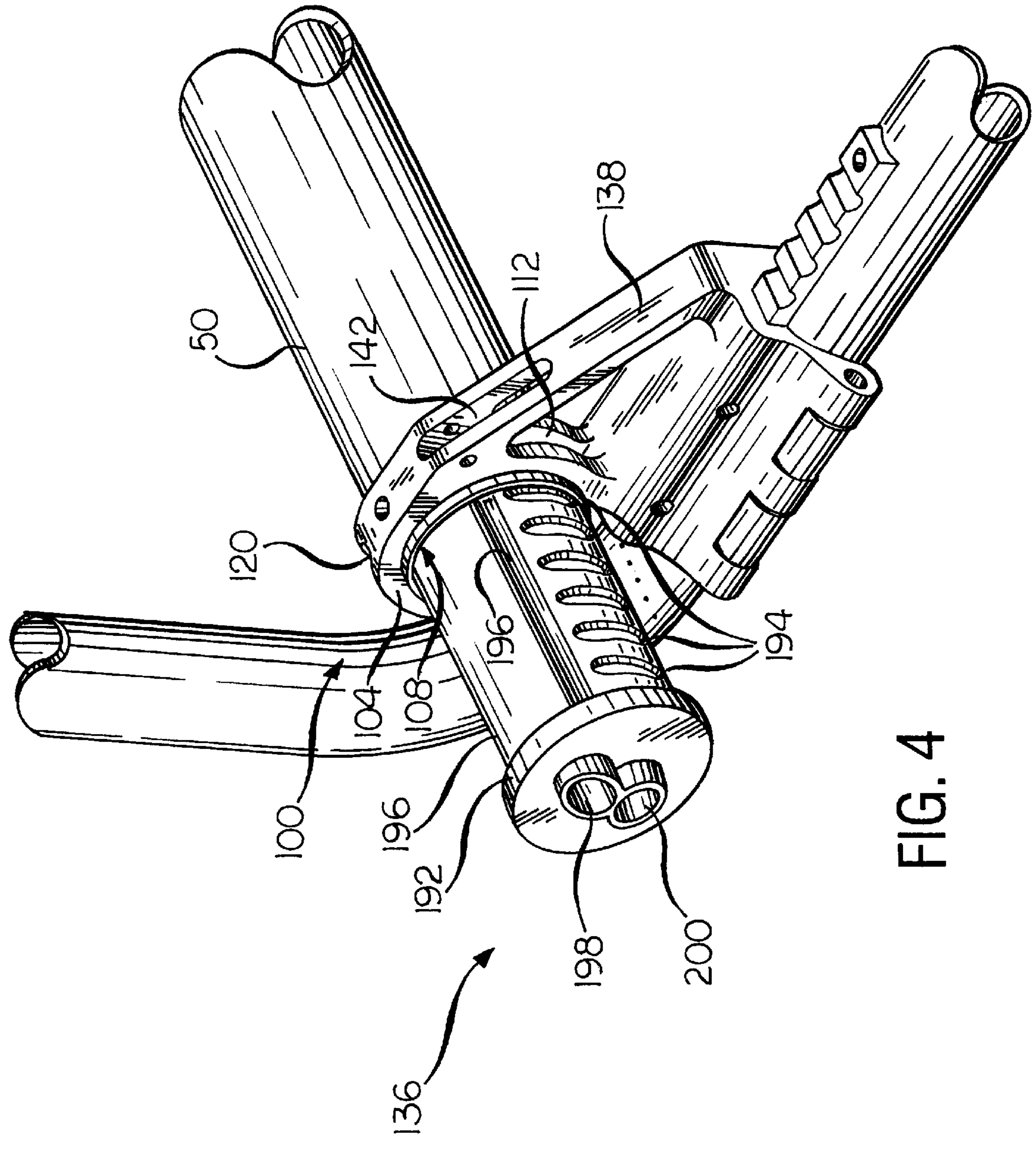
FIG. 4 is a perspective view of the mounting assembly shown in FIG. 1.

To latch the latch lever 132, the latch lever 132 is displaced downward in a direction of arrow A (FIG. 3). As the latch lever 132 is displaced downward, a cam surface 186 of a latch hook 188 engages an end of the slot 142 in the brace 138 to bias the locking release lever 150 rearward in a direction of arrow R. Upon fully depressing the latch lever 132, the locking release lever 150 is urged forward in a direction opposite to arrow R (such as by the helical coil spring 190 shown) and the latch hook 188 (FIG. 3) engages the brace 138 trapping the latch lever 132 against the brace 138 and the slot-engaging portion 128 of the latch lever 132 into engagement with the aligned slots 112 and 114 in the ring 104 and the camber tube 50. To unlatch the latch hook 188, the lever portion 166 of locking release lever 150 is displaced in a rearward direction to unhook the latch hook 188 from the latch lever 132 and release the slot-engaging portion 128 out of engagement with the slots 112 and 114.

The camber plug 136 is an elongate, substantially cylindrical member that is dimensioned to fit snugly in each end of the camber tube 50. An outer end of the camber plug 136 has a radial projection or flange 192 to limit the travel of the camber plug 136 in a lateral direction relative to the camber tube 50. The camber plug 136 has opposing sides (only one side shown). Each side may be provided with a plurality of laterally spaced, vertically extending disposed teeth defining a plurality of vertical recesses 194. The recesses 194 are adapted to align with the slots 112 and 114 (FIG. 3) to receive the slot-engaging portion 128 (FIG. 3) of the latch lever 132 (FIG. 3). The slot-engaging portion 128 may engage any one of the recesses 194 to incrementally or discretely adjust the camber plug 136 laterally, so as to compensate for the camber angle of the drive wheels 48.

The camber plug 136 further includes a pair of elongate, laterally extending grooves 196. The grooves 196 may be spaced equidistantly forward and rearward from the top center of the camber plug 136. Each groove 196 is adapted to align with the screw hole 120 in the ring 104 and an aligning screw hole 118 (FIG. 3) in the camber tube 50. With the groove 196 and the screw holes 120 and 118 aligned, the setscrew 134 may be tightened to engage the groove 196. The setscrew 134 may engage either one of the grooves depending on the orientation of the camber plug 136 in which the camber plug 136 is inserted. The setscrew 134 is engageable with the groove 196 to orient the camber plug 136 in the camber tube 50 and to hold the camber plug 136 in a substantially fixed position relative to the camber tube 50. The setscrew 134 may also engage the groove 196 at any point laterally along the groove 196 to permit the camber plug 136 to be adjusted laterally.

Figure 5A:
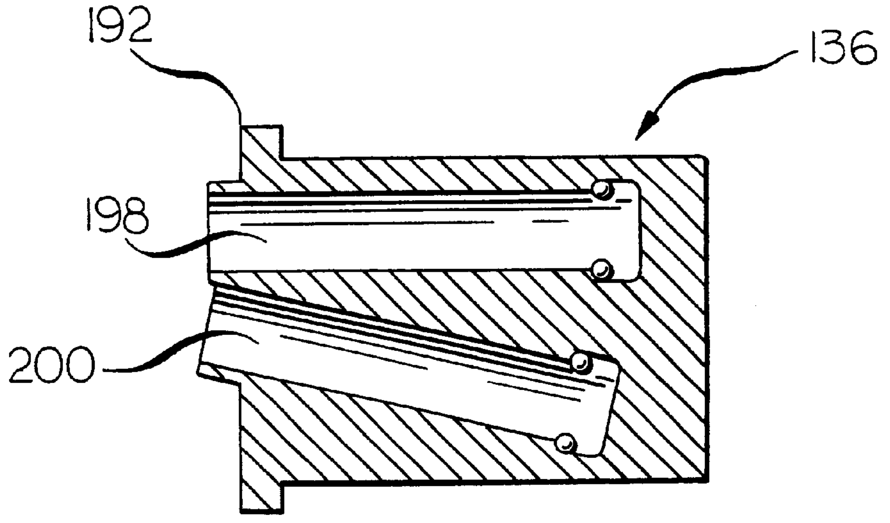
FIGS. 5A and 5B are sectional views of alternative camber plugs.
Figure 5B:
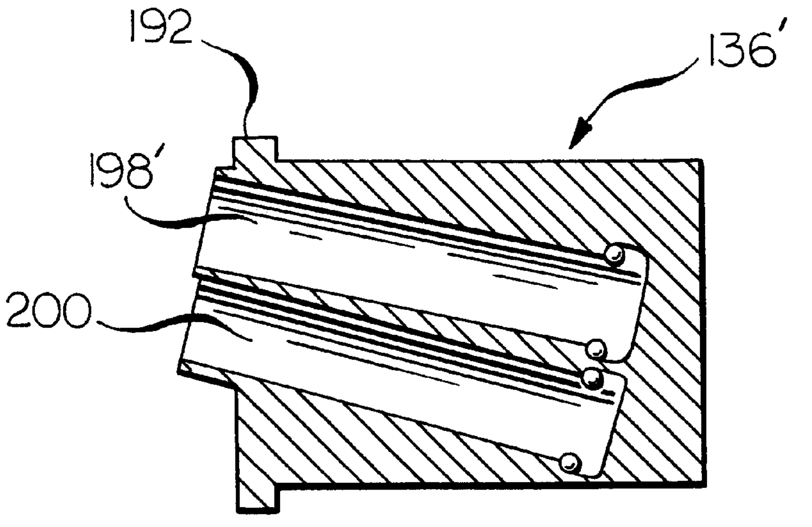

The outer end of the camber plug 136 has at least one axle sleeve 198 therein for receiving a drive wheel axle (not shown). The axle sleeve 198 may be at any suitable angle (e.g., 0, 4, 8, 12, or 16 degrees). It is preferred that the camber plug 136 has a plurality of axle sleeves. In the drawings, there are illustrated two axle sleeves 198, 200. Each axle sleeve 198, 200 may be disposed at a different angle relative to horizontal. For example, one axle sleeve 198 (FIG. 5A) may be disposed at one angle (e.g., 0 degrees) relative to a horizontal axis (to provide a zero degree camber angle for the drive wheels 48) while the other axle sleeve 200 may be disposed at some other angle (e.g., 12 degrees) relative to the horizontal axis (to provide a 12 degree camber angle). Alternative axle sleeves, such as axle sleeve 198' shown in FIG. 5B, may be disposed at an angle other than zero degrees (e.g., 3 degrees) relative to a horizontal axis.

In operation, an axle, such as a quick release axle (not shown), may be inserted into one of the axle sleeves 198 at a predetermined camber angle. To change the camber angle, the axle may be removed and inserted into the other axle sleeve 200 without removing or rotating the camber plug 136. To adjust the lateral position of the camber plug 136, the slot-engaging portion 128 of the latch lever 132 is first released by displacing the lever portion 166 of the locking release lever 150 to release the slot-engaging portion 128 of the locking release lever 150. Next, the setscrew 134 is loosened from the groove 196 enough to permit the camber plug 136 to be laterally displaced. After the camber plug 136 is in a desired lateral position, the setscrew 134 may be tightened back into the groove 196 and the latch lever 132 may be displaced to again engage the slot-engaging portion 128 with the recesses 194 in the camber plug 136.

The present invention offers several advantages. First, the lateral distance between the drive wheels 48 may be adjusted by removing the setscrew 134 and displacing the camber plug 136 laterally. The discretely spaced recesses 194 in the camber plugs 136 permit the camber plugs 136 to be laterally adjusted by discrete amounts. The camber angle of the drive wheels 48 may be adjusted simply by unlatching a latch lever 132, removing the drive wheel axle from an axle sleeve 198, 200 and reinserting drive wheel axle into another axle sleeve. It should be noted that the camber plugs may removed and replaced with other camber plugs having one or more axle sleeves disposed at different angles from those of the camber plug 136 being replaced.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wheel mounting assembly comprising:

a camber plug having an outer end and a plurality of axle sleeves in said outer end, each said axle sleeve being disposed at a different angle relative to horizontal, each said axle sleeve being adapted to receive a drive wheel axle, the axle being adapted to be removed from one of said axle sleeve and inserted into the another one of said axle sleeves to change the camber angle of the axle without changing the orientation of said camber plug.

2. The assembly of claim 1, wherein said camber plug is dimensioned to fit snugly in a camber tube.

3. The assembly of claim 2, wherein in said camber plug further includes a flange for limiting the travel of said camber plug in a lateral direction relative to the camber tube.

4. The assembly of claim 2, further including means for securing said camber plug with respect to the camber tube.

5. The assembly of claim 4, wherein in said securing means is a latch lever that is adapted to engage a slot in said camber plug which is adapted to align with a slot in the camber tube.

6. The assembly of claim 4, wherein in said securing means is a set screw that is adapted to engage a hole in said camber plug which is adapted to align with a hole in the camber tube.

7. A wheelchair comprising:

a pair of side rails;

a camber tube spanning said side rails and coupled to said side rails;

a pair of camber plugs each having an outer end and a plurality of axle sleeves in said outer end, each said axle sleeve being disposed at a different angle relative to horizontal, each said camber plug being adapted to be received in a corresponding end of said camber tube, each said axle sleeve being adapted to receive an axle, said axles being adapted to be removed from one of said axle sleeve and inserted into the another one of said axle sleeves to change the camber angle of said axles without changing the orientation of said camber plugs; and a drive wheel movably supported with respect to each said axle.

8. The assembly of claim 7, wherein said camber tube is coupled to said side rails by a pair of opposing clamps.

9. The assembly of claim 8, wherein said clamps are longitudinally adjustable relative to said side frames.

10. The assembly of claim 8, further including a rail attached to each said side frame, each said rail including recesses adapted to receive a pin extending through each said clamp, said clamps being adjustable relative to said side frames by selectively engaging said pin in different said recesses.

11. The assembly of claim 10, wherein said recesses are spaced discretely apart to permit incremental adjustments of said clamps relative to said side frames.

12. The assembly of claim 10, wherein each said clamp defines a recess for receiving one of said rails.

13. The assembly of claim 8, wherein a bracket extends from each said clamp.

14. The assembly of claim 7, wherein said camber tube is substantially cylindrical and each said bracket has a cylindrical ring defining an opening for receiving a corresponding end of said camber tube.

15. The assembly of claim 14, wherein each said ring is provided with a slot which is adapted to align with a slot in a corresponding one of said camber tube ends to receive a slot-engaging portion of a latch lever to engage a corresponding one of said camber plugs to secure said camber plug with respect to a corresponding camber tube end.

16. The assembly of claim 15, wherein each said camber plug has a plurality of recesses that are adapted to align with said aligned slots to receive said slot-engaging portion, said slot-engaging portion may engage any one of said camber plug recesses to incrementally adjust said camber plug laterally relative to said camber tube.

17. The assembly of claim 14, wherein each said ring is provided with a hole that is adapted to align with a hole in said camber tube to receive a setscrew to engage a corresponding one of said camber plugs to secure said camber plug with respect to a corresponding camber tube end.

18. The assembly of claim 17, wherein each said camber plug further includes a groove which is adapted to align with aligning holes so that said setscrew may be tightened to engage said groove.

* * * * *

UNITED STATES PATENT AND TRADEMARK OFFICE

CERTIFICATE OF CORRECTION

PATENT NO. : 6,247,717 B1
DATED : June 19, 2001
INVENTOR(S) : Terrence F. Lovins et al.

It is certified that error appears in the above-identified patent and that said Letters Patent is hereby corrected as shown below:

Column 6,
Lines 20, 22, 24, 30, 33, 35, 37, 41, 47, 53 and 58, delete "assembly" and insert -- wheelchair --

Signed and Sealed this

Seventh Day of May, 2002

*Attest:*

JAMES E. ROGAN
*Director of the United States Patent and Trademark Office*

*Attesting Officer*